United States Patent
Lee et al.

(10) Patent No.: US 9,007,363 B2
(45) Date of Patent: Apr. 14, 2015

(54) DISPLAY APPARATUS AND METHOD OF DISPLAYING THREE DIMENSIONAL IMAGE

(75) Inventors: Jung-Hun Lee, Seoul (KR); Kyungmo Koo, Seoul (KR); Taeho Kim, Asan-si (KR); Seongnam Lee, Seoul (KR); Seungbeom Park, Seoul (KR); Duckjong Suh, Seoul (KR)

(73) Assignee: Samsung Display Co., Ltd., Yongin (KR)

(*) Notice: Subject to any disclaimer, the term of this patent is extended or adjusted under 35 U.S.C. 154(b) by 220 days.

(21) Appl. No.: 13/485,197

(22) Filed: May 31, 2012

(65) Prior Publication Data

US 2013/0106838 A1    May 2, 2013

(30) Foreign Application Priority Data

Oct. 27, 2011 (KR) .................. 10-2011-0110315

(51) Int. Cl.
*G06T 15/00* (2011.01)
*G06G 5/00* (2006.01)
*H04N 13/04* (2006.01)
*G02B 27/22* (2006.01)
*G02F 1/13* (2006.01)
*G02F 1/1347* (2006.01)

(52) U.S. Cl.
CPC ........ *H04N 13/0413* (2013.01); *G02B 27/2214* (2013.01); *H04N 13/0422* (2013.01); *G02F 1/1323* (2013.01); *G02F 1/1347* (2013.01)

(58) Field of Classification Search
CPC ..... H04N 13/00; H04N 13/04; H04N 13/047; H04N 5/66; H04N 7/163; H04N 13/0413; H04N 13/0422; G09G 3/003; G09G 3/36; G09G 3/00; G09G 3/20; G06F 9/00; G06F 9/30; G06F 9/35; G06F 3/038; G06F 3/044; G06F 3/042; G06T 15/00; G02B 27/2214; G02F 1/1323; G02F 1/1347

See application file for complete search history.

(56) References Cited

U.S. PATENT DOCUMENTS

| | | | | |
|---|---|---|---|---|
| 5,668,613 | A | * | 9/1997 | Kim et al. ................... 349/38 |
| 6,094,216 | A | * | 7/2000 | Taniguchi et al. ............ 348/51 |
| 6,124,920 | A | * | 9/2000 | Moseley et al. .............. 349/201 |
| 7,426,068 | B2 | * | 9/2008 | Woodgate et al. ........... 359/237 |
| 2011/0018860 | A1 | * | 1/2011 | Parry-Jones et al. ......... 345/214 |
| 2011/0051239 | A1 | | 3/2011 | Daiku |
| 2012/0013606 | A1 | * | 1/2012 | Tsai et al. .................... 345/419 |

FOREIGN PATENT DOCUMENTS

KR    10-2003-0021293    3/2003
KR    10-2005-0056068    6/2005

(Continued)

*Primary Examiner* — Kee M Tung
*Assistant Examiner* — Sing-Wai Wu
(74) *Attorney, Agent, or Firm* — H.C. Park & Associates, PLC

(57) ABSTRACT

A display apparatus includes a display panel, a barrier panel, and a barrier panel controller. The display panel includes a plurality of pixel columns divided into a first pixel column groups and a second pixel column groups based on a selection signal used to determine a focal length of a three-dimensional image. The barrier panel forms a plurality of first barrier patterns spaced apart from each other and a plurality of second barrier patterns spaced apart from each other. The barrier panel controller controls a distance between the first barrier patterns and a distance between the second barrier patterns based on the selection signal.

17 Claims, 13 Drawing Sheets

(56) References Cited

FOREIGN PATENT DOCUMENTS

| KR | 10-2006-0096844 | 9/2006 |
| KR | 10-0828696 | 5/2008 |
| KR | 10-2009-0056655 | 6/2009 |

\* cited by examiner

DISPLAY APPARATUS AND METHOD OF DISPLAYING THREE DIMENSIONAL IMAGE

CROSS-REFERENCE TO RELATED APPLICATION

This application claims priority from and the benefit of Korean Patent Application No. 10-2011-0110315, filed on Oct. 27, 2011, which is incorporated herein by reference for all purposes as if fully set forth herein.

BACKGROUND OF THE INVENTION

1. Field of the Invention

Exemplary embodiments of the present invention relate to a display apparatus. More particularly, the present invention relates to a display apparatus capable of displaying a three-dimensional image without glasses.

2. Discussion of the Background

A three-dimensional (3D) image display apparatus typically displays a 3D image using a stereoscopic display technique or an auto-stereoscopic display technique.

The auto-stereoscopic display technique is classified into a glass-type and a non-glass type. A glass-type auto-stereoscopic display changes a polarizing direction of a left-eye image and a right-eye image using a patterned retarder or displays the left-eye image and the right-eye image during different time periods to provide a 3D image to observers.

A non-glass type auto-stereoscopic display includes a parallax barrier panel to separate an axis of the left-eye image from an optical axis of the right-eye image. A display apparatus including a parallax barrier panel provides the left-eye image and the right-eye image to left and right eyes of an observer through slits disposed across the parallax barrier panel.

However, since the positions of the slits are fixed in the parallax barrier panel of the display apparatus, the observer needs to be distant from the display apparatus by a fixed focal length in order to watch a 3D image.

SUMMARY OF THE INVENTION

Exemplary embodiments of the present invention provide a non-glass type display apparatus capable of providing plural focal lengths to observers in a three-dimensional mode.

Additional features of the invention will be set forth in the description which follows, and in part will be apparent from the description, or may be learned by practice of the invention.

An exemplary embodiment of the prevent invention discloses a display apparatus which includes a display panel comprising a plurality of pixel columns, the plurality of pixel columns being divided into a first pixel column groups and a second pixel column groups based on a selection signal, the first pixel column groups to display a first left-eye image before displaying a second right-eye image and the second pixel column groups to display a first right-eye image before displaying a second left-eye image, a barrier panel to form a plurality of first barrier patterns spaced apart from each other when the first pixel column groups display the first left-eye image and the second pixel column groups display the first right-eye image and to form a plurality of second barrier patterns spaced apart from each other and different from the first barrier patterns when the first pixel column groups display the second right-eye image and the second pixel column groups display the second left-eye image, the selection signal being indicative of a distance between the barrier panel and a user, and a barrier panel controller to control at least one of a first interval between the first barrier patterns and a second interval between the second barrier patterns based on the selection signal.

Another exemplary embodiment of the prevent invention discloses a display apparatus which includes a display panel comprising a plurality of pixel columns, the plurality of pixel columns to be divided into first pixel column groups and second pixel column groups based on a distance signal indicative of a distance between the display panel and a user, the first pixel column groups to display a first left-eye image and the second pixel column groups to display a first right-eye image during a first time period, and the first pixel column groups to display a second right-eye image and the second pixel column groups to display a second left-eye image during a second time period, a barrier panel to form a plurality of first barrier patterns spaced apart from each other and a plurality of first slit patterns respectively disposed between the first barrier patterns during the first time period to allow the first left eye image to be directed to the left eye of the user and the first right eye image to be directed to the right eye of the user through the plurality of first slit patterns, and to form a plurality of second barrier patterns spaced apart is from each other and a plurality of second list patterns respectively disposed between the second barrier patterns during the second time period to allow the second left eye image to be directed to the left eye of the user and the second right eye image to be directed to the right eye of the user through the plurality of second slit patterns, and a barrier panel controller to control at least one of a width of each of the first barrier patterns and a width of each of the second barrier patterns based on the distance signal.

Still another exemplary embodiment of the prevent invention discloses a method of displaying a three dimensional image using a display panel and a barrier panel, which includes displaying, on the display panel, a first left-eye image using a first pixel column group and a first right-eye image using a second pixel column group different from the first pixel column group, forming, using the barrier panel, first barrier patterns and first slit patterns, the first left-eye image and the first right-eye image being visible through the first slit patterns, and determining a distance between the barrier panel and a viewer, wherein a width of the first slit patterns is determined according to the distance.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
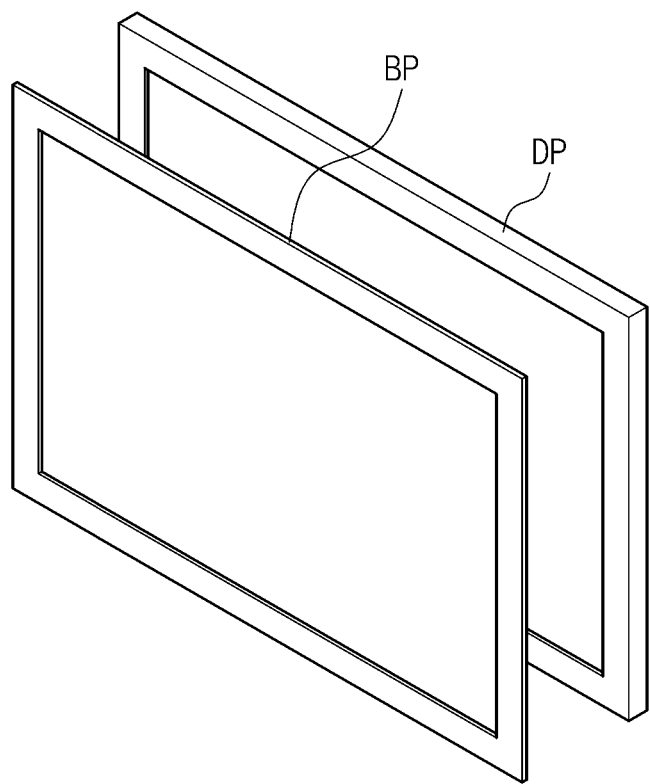
FIG. 1 is an exploded perspective view that illustrates a display apparatus according to an exemplary embodiment of the present invention.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be explained in detail with reference to the accompanying drawings.

Figure 2:
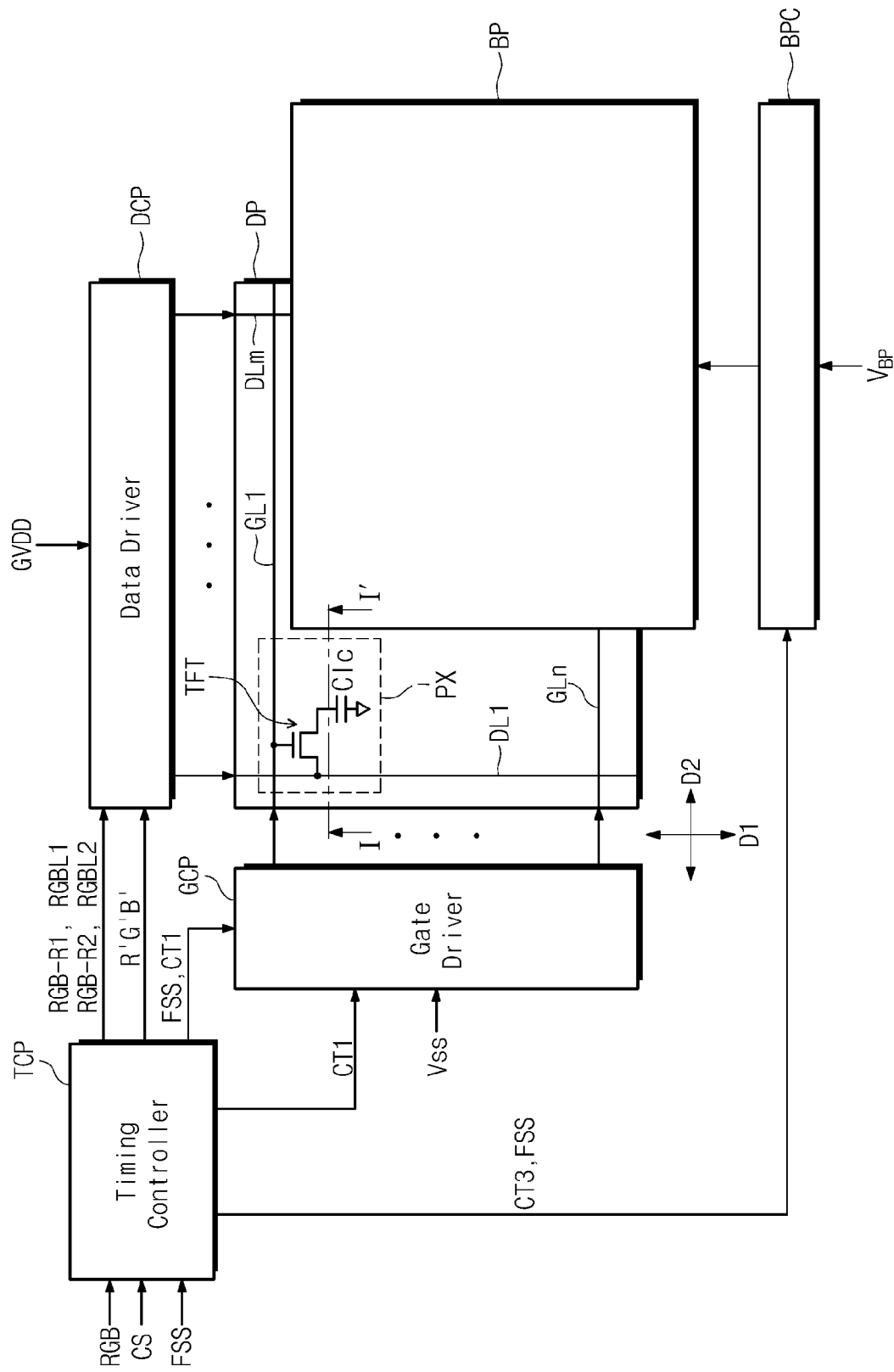
FIG. 2 is a block diagram that illustrates a display apparatus shown in FIG. 1.
Figure 3:
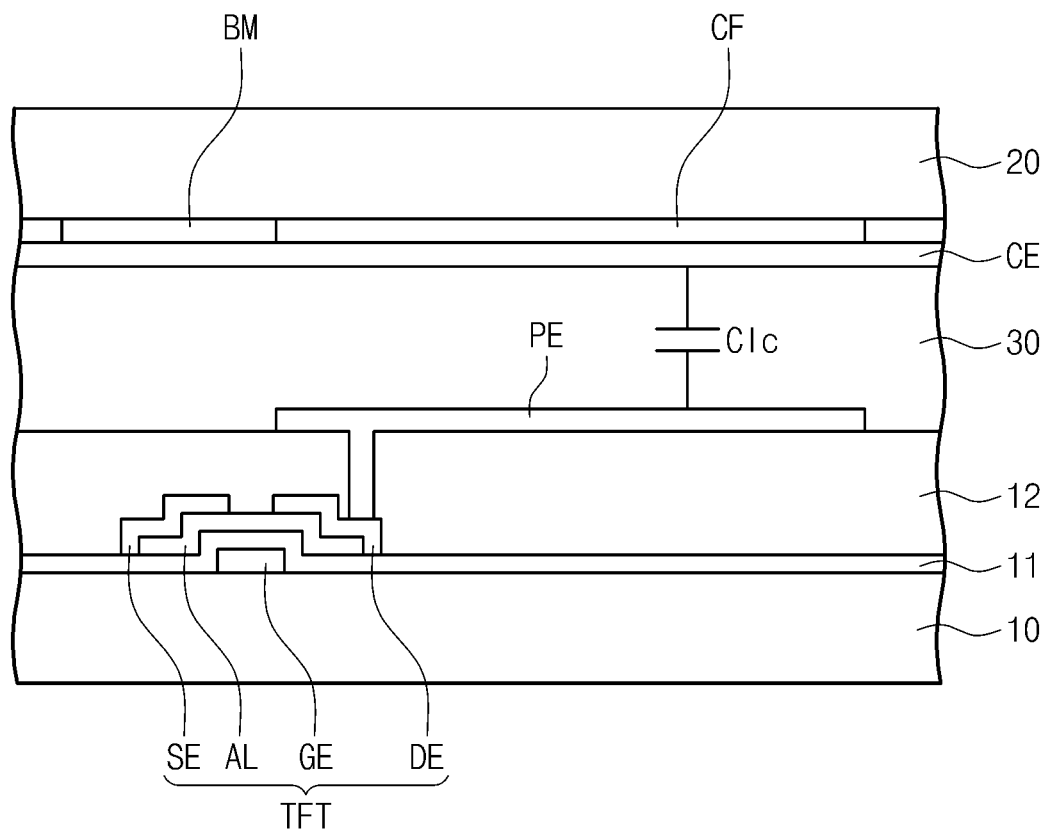
FIG. 3 is a cross-sectional view taken along a line I-I' shown in FIG. 2.
Figure 4:
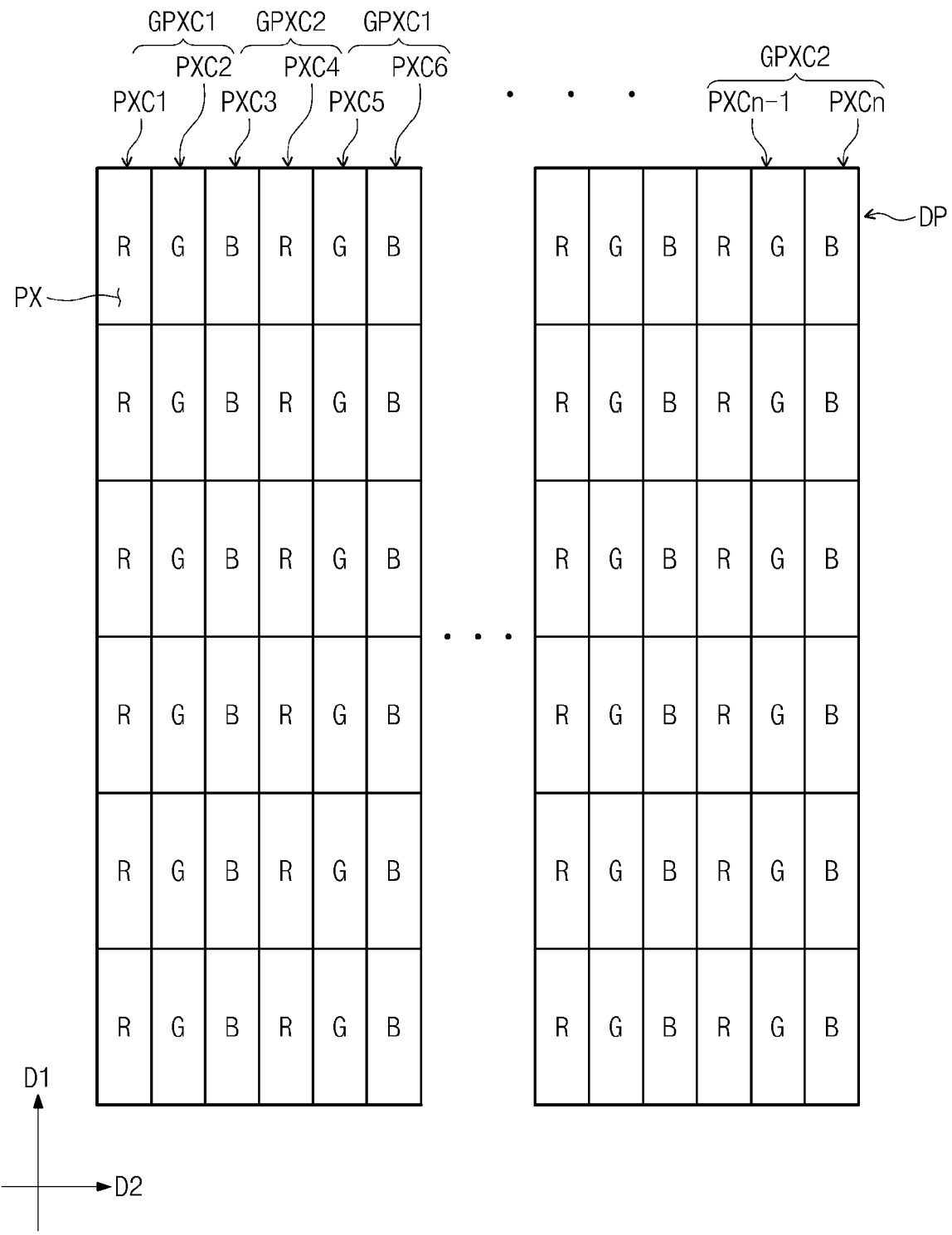
FIG. 4 is a plan view that illustrates a display panel shown in FIG. 1.
Figure 5:
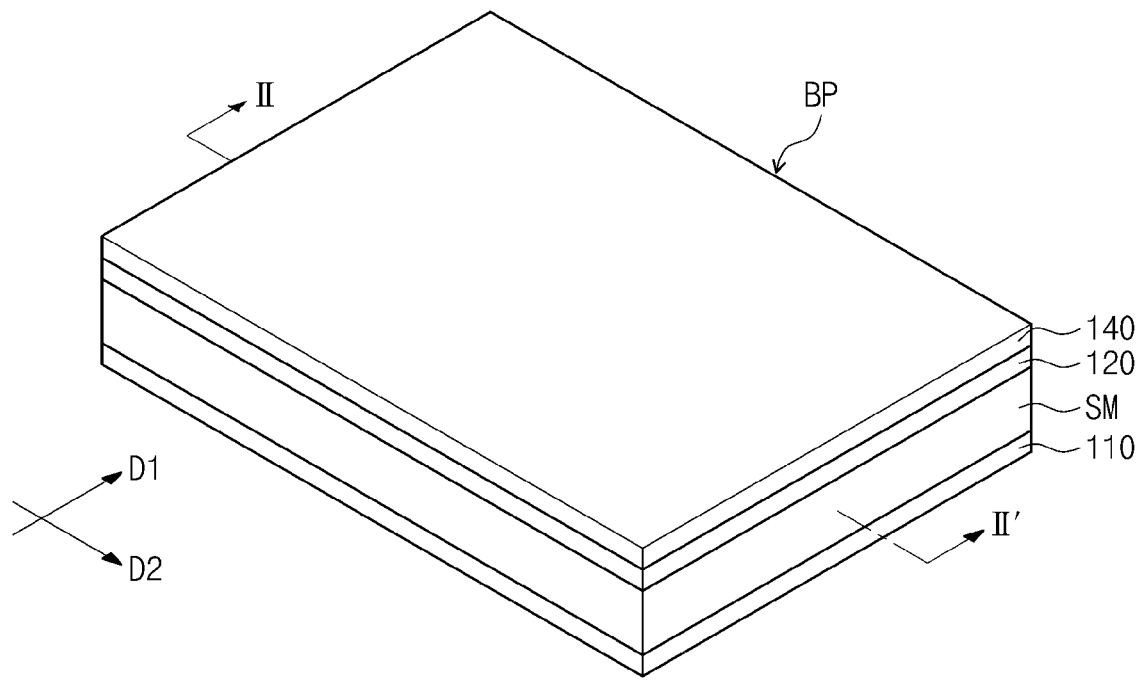
FIG. 5 is a perspective view that illustrates a barrier panel shown in FIG. 1.
Figure 6:
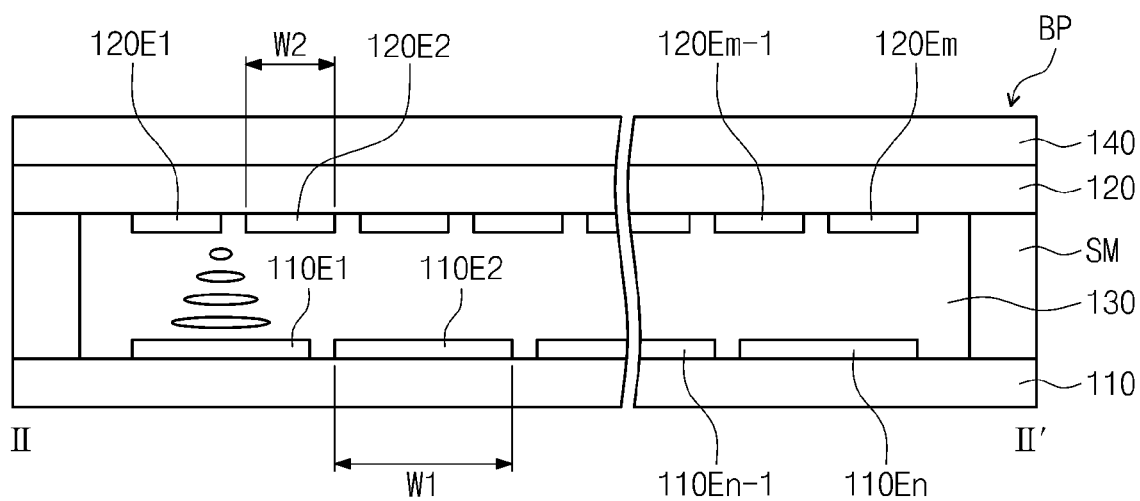
FIG. 6 is a cross-sectional view taken along a line II-II' shown in FIG. 5.

FIG. 1 is an exploded perspective view that illustrates a display apparatus according to an exemplary embodiment of the present invention, FIG. 2 is a block diagram that illustrates a display apparatus shown in FIG. 1, FIG. 3 is a cross-sectional view taken along a line I-I' shown in FIG. 2, FIG. 4 is a plan view that illustrates a display panel shown in FIG. 1, FIG. 5 is a perspective view that illustrates a barrier panel shown in FIG. 1, and FIG. 6 is a cross-sectional view taken along a line II-II' shown in FIG. 5.

Referring to FIG. 1, a display apparatus may include a display panel DP to display an image and a barrier panel BP disposed on the display panel DP.

The display panel DP displays a two-dimensional ("2D") image in 2D mode and displays a three-dimensional ("3D") image in 3D mode. The display apparatus is capable of operating in the 2D or 3D mode. For example, the display apparatus may operate in the 2D or 3D mode in response to a signal provided by the selection of a user or in response to a received 2D or 3D signal.

The display panel DP may be a various type of display panels, such as a liquid crystal display panel, an organic light emitting display panel, an electrophoretic display panel, an electrowetting display panel, etc.

Hereinafter, the liquid crystal display panel including two substrates and a liquid crystal layer disposed between the two substrates will be described as the display panel DP as a representative example. Although not shown in figures, the display apparatus may further include a pair of polarizing plates facing each other while interposing the liquid crystal layer therebetween and a backlight unit to provide a light to the liquid crystal display panel.

Referring to FIG. 2, FIG. 3, and FIG. 4, the display panel DP may include a first substrate 10, a second substrate 20 facing the first substrate 10, and a liquid crystal layer 30 interposed between the first substrate 10 and the second substrate 20.

As shown in FIG. 2, the first substrate 10 may include a plurality of gate lines GL1 to GLn extending in a row direction D2 and arranged in a column direction D1 and a plurality of data lines DL1 to DLm insulated from the gate lines GL1 to GLn while crossing the is gate lines GL1 to GLn. The data lines DL1 to DLm extend in the column direction D1 and arranged in the row direction D2.

Referring to FIG. 2 and FIG. 3, a plurality of thin film transistors TFTs is disposed on the first substrate 10. Each thin film transistor TFT is connected to a corresponding gate line of the gate lines GL1 to GLn and a corresponding data line of the data lines DL1 to DLm. In the present exemplary embodiment, the thin film transistors TFT have the same structure and function, and thus one thin film transistor TFT will be described in detail.

In addition, a plurality of pixel electrodes PEs is disposed on the first substrate 10 to be respectively connected to the thin film transistors TFTs. Each thin film transistor TFT switches a pixel voltage applied to a corresponding pixel electrode of the pixel electrodes PEs.

The thin film transistor TFT includes a gate electrode GE, an active layer AL, a source electrode SE, and a drain electrode DE.

The gate electrode GE is branched from a corresponding gate line of the gate lines GL1 to GLn. A gate insulating layer 11 is disposed on the first substrate 10 to cover the gate electrode GE. The active layer AL has an island shape and is disposed on the gate insulating layer 11. The source electrode SE and the drain electrode DE are disposed on the active layer AL and spaced apart from each other to expose a portion of the active layer AL. The source electrode SE is branched from a corresponding data line of the data lines DL1 to DLm.

A protective layer 12 is disposed on the gate insulating layer 11 to cover the source electrode SE, the drain electrode DE, and the exposed active layer AL.

The pixel electrode PE is disposed on the protective layer 12 and is electrically connected to the drain electrode DE. To this end, the protective layer 12 is provided with a contact hole formed therethrough and the pixel electrode PE is connected to the drain electrode DE through the contact hole.

As shown in FIG. 2 and FIG. 3, a common electrode CE is disposed on the second substrate 20. The common electrode CE is disposed on a surface of the second substrate 20, which is adjacent to the liquid crystal layer 30. In addition, color filters CF, which allow the light passing through the liquid crystal layer 30 to have a predetermined color and a black matrix BM, which prevents the light from being scattered are disposed on the second substrate 20. The color filters CF and the black matrix BM may be disposed on the same layer and directly formed on the surface of the second substrate 20. In addition, the common electrode CE is disposed on the color filters CF and the black matrix BM. In an alternative exemplary embodiment, the color filters CF and the black matrix BM may be disposed on the first substrate 10.

In addition, the display panel DP includes a plurality of pixel columns PXC1 to PXCn as shown in FIG. 4.

Each of the pixel columns PXC1 to PXCn includes a plurality of pixels PXs. The pixels PXs included in each pixel column are arranged in the column direction D1.

As shown in FIG. 2 and FIG. 3, each pixel PX includes a liquid crystal capacitor Clc and the thin film transistor TFT switching a voltage applied to the liquid crystal capacitor Clc.

The liquid crystal capacitor Clc includes a first electrode, a second electrode facing the first electrode, and a dielectric layer interposed between the first electrode and the second electrode. As shown in FIG. 3, the first electrode is the pixel electrode PE, the second electrode is the common electrode CE, and the dielectric layer is the liquid crystal layer 30. Accordingly, the second electrodes of the liquid crystal capacitors Clc respectively included in the pixels PX may be integrally formed with each other. Although not shown in FIG. 2 and FIG. 3, each of the pixels PX may further include a storage capacitor.

As described with reference to FIG. 3, each of the pixels PXs includes the color filter CF. In addition, the pixel columns PXC1 to PXCn may include different color filters CFs from each other.

Among the pixel columns PXC1 to PXCn, three successive pixel columns may include different color filters from each other. As shown in FIG. 4, a first pixel column PXC1 includes red color filters R, a second pixel column PXC2 includes green color filters G, and a third pixel column PXC3 includes blue color filters B. As another example, the first, second, and third pixel columns PXC1, PXC2, and PXC3 may include cyan, magenta, and yellow color filters C, M, and Y, respectively.

The arrangement of the color filters of the first, second, and third pixel columns PXC1, PXC2, and PXC3 may be repeated every three pixel columns.

The pixel columns PXC1 to PXCn are divided into first pixel column groups GPXC1 and second pixel column groups GPXC2 in 3D mode in which the display apparatus displays the 3D image. For instance, as shown in FIG. 4, each first pixel column group GPXC1 includes two pixel columns adjacent to each other, and each second pixel column group GPXC2 includes two pixel columns adjacent to each other and different from those of the first pixel column group GPXC1. The first pixel column groups GPXC1 are alternately arranged with the second pixel column groups GPXC2.

Referring to FIG. 5 and FIG. 6, the barrier panel BP includes a plurality of first electrodes 110E1 to 110En, a plurality of second electrodes 120E1 to 120Em facing the first electrodes 110E1 to 110En, and a liquid crystal layer 130 interposed between the first electrodes 110E1 to 110En and the second electrodes 120E1 to 120Em. In addition, the barrier panel BP is includes a polarizing member 140 disposed on the first electrodes 110E1 to 110En and the second electrodes 120E1 to 120Em.

The first electrodes 110E1 to 110En are disposed on a first substrate 110. The first electrodes 110E1 to 110En extend in the column direction D1, in which the pixel columns PXC1 to PXCn extend, and arranged in the row direction D2.

The second electrodes 120E1 to 120Em are disposed on a second substrate 120 spaced apart from the first substrate 110. The second electrodes 120E1 to 120En extend in the column direction D1, in which the pixel columns PXC1 to PXCn extend, and arranged in the row direction D2.

The first substrate 110 and the second substrate 120 may be formed of a transparent material, such as glass, plastic, etc., and the first electrodes 110E1 to 110En and the second electrodes 120E1 to 120Em may include a transparent material, such as indium tin oxide (ITO), indium zinc oxide (IZO), tin oxide (SnO2), zinc oxide (ZnO), etc.

Each of the first electrodes 110E1 to 110En has a width W1. A distance between two first electrodes adjacent to each other of the first electrodes 110E1 to 110En may be smaller than the width W1 of each of the first electrodes 110E1 to 110En.

The first electrodes 110E1 to 110En may be applied with the same voltage, or a portion of the first electrodes 110E1 to 110En may be applied with a voltage different from a voltage applied to a remaining portion of the first electrodes 110E1 to 110En.

Each of the second electrodes 120E1 to 120Em has a width W2. The width W2 of the second electrodes 120E1 to 120Em may be different from the width W1 of the first electrodes 110E1 to 110En. In the present exemplary embodiment, the width W2 of the second electrodes 120E1 to 120Em is smaller than the width W1 of the first electrodes 110E1 to 110En is as shown in FIG. 6.

The second electrodes 120E1 to 120Em may be applied with the same voltage, or a portion of the second electrodes 120E1 to 120Em may be applied with a voltage different from a voltage applied to a remaining portion of the second electrodes 120E1 to 120Em.

The liquid crystal layer 130 is disposed between the first substrate 110 and the second substrate 120 and sealed by a sealing member SM disposed between the first and second substrates 110 and 120 and formed along an outer portion of the first and second substrates 110 and 120.

The liquid crystal layer 130 includes liquid crystal molecules aligned between the first substrate 110 and the second substrate 120. The liquid crystal layer 130 may include the liquid crystal molecules aligned in a twisted nematic alignment. The liquid crystal molecules in the twisted nematic alignment are successively twisted from the first substrate 110 to the second substrate 120. However, the alignment of the liquid crystal molecules may have various alignments. For instance, the liquid crystal layer 130 may include liquid crystal molecules aligned in a vertical alignment or liquid crystal molecules aligned in an in-plane switching alignment.

When a first voltage is applied to the portion of the first electrodes 110E1 to 110En and a second voltage different from the first voltage is applied to the remaining portion of the first electrodes 110E1 to 110En, the arrangement of a portion of the liquid crystal molecules is varied, thereby forming a plurality of barrier patterns. The second electrodes 120E1 and 120Em are applied with either the first voltage or the second voltage.

Similar to the first electrodes 110E1 to 110En, in the case that the first voltage is applied to the portion of the second electrodes 120E1 to 120Em and the second voltage different is from the first voltage is applied to the remaining portion of the second electrodes 120E1 to 120Em, the barrier patterns are formed.

In the present exemplary embodiment, the number of the barrier patterns formed by applying two different voltages to the first electrodes 110E1 to 110En may be different from the number of the barrier patterns formed by applying two different voltages to the second electrodes 120E1 to 120Em.

Hereinafter, the barrier patterns will be described in detail with reference to FIG. 6, FIG. 7A, FIG. 7B, FIG. 7C, and FIG. 7D. FIG. 7A, FIG. 7B, FIG. 7C, and FIG. 7D are views that illustrate barrier patterns formed in the barrier panel shown in FIG. 5. In the present exemplary embodiment, the liquid crystal layer including the liquid crystal molecules aligned in the twisted nematic alignment will be described as a representative example, and the barrier panel BP operated in a normally white mode will be described.

When the first voltage is applied to the first electrodes 110E1 to 110En and the second electrodes 120E1 to 120Em, the arrangement of the liquid crystal layer 130 is not changed.

Figure 7A:
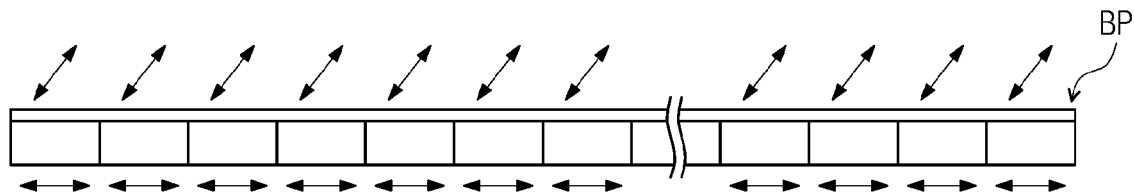
FIG. 7A, FIG. 7B, FIG. 7C, and FIG. 7D are views that illustrate barrier patterns formed in the barrier panel shown in FIG. 5.

Referring to FIG. 7A, the barrier panel BP does not include the barrier patterns. An incident light (or an image) polarized in a first direction passes through the liquid crystal layer 130 and the polarizing member 140, and the incident light is polarized in a second direction different from the first direction while passing through the liquid crystal layer 130 and the polarizing member 140. The first voltage may be a ground voltage.

When the second voltage different from the first voltage is applied to odd-numbered second electrodes 120E1 to 120Em-1 of the second electrodes 120E1 to 120Em and the first voltage is applied to even-numbered second electrodes 120E2 to 120Em, the arrangement of the liquid crystal molecules disposed in areas corresponding to the odd-numbered second electrodes 120E1 to 120Em-1 is varied. In this case, the first electrodes 110E1 to 110En are applied with the first voltage.

Figure 7B:
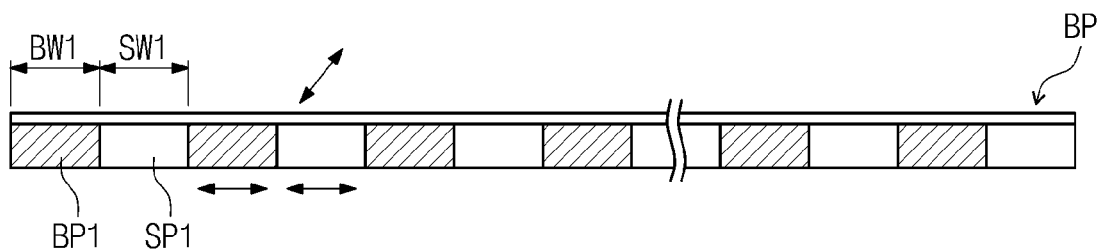

As shown in FIG. 7B, the barrier patterns BP1 are formed in areas corresponding to the odd-numbered second electrodes 120E1 to 120Em-1, in which the arrangement of the liquid crystal molecules is varied. Each of the barrier patterns BP1 has the width BW1 corresponding to the width W2 of the odd-numbered second electrodes 120E1 to 120Em-1.

The even-numbered second electrodes 120E2 to 120Em are applied with the first voltage as the first electrodes 110E1 to 110En. The arrangement of the liquid crystal molecules disposed in areas corresponding to the second electrodes 120E2 to 120Em is not changed.

As shown in FIG. 7B, slit patterns SP1 are formed in areas corresponding to the even-numbered second electrodes 120E2 to 120Em, in which the arrangement of the liquid crystal molecules is not varied. Each of the slit patterns SP1 has a width SW1 corresponding to the width W2 of the even-numbered second electrodes 120E2 to 120Em.

The light (or image) incident into the barrier patterns BP1 does not pass through the polarizing member 140 and the light incident into the slit patterns SP1 passes through the polarizing member 140.

Figure 7C:
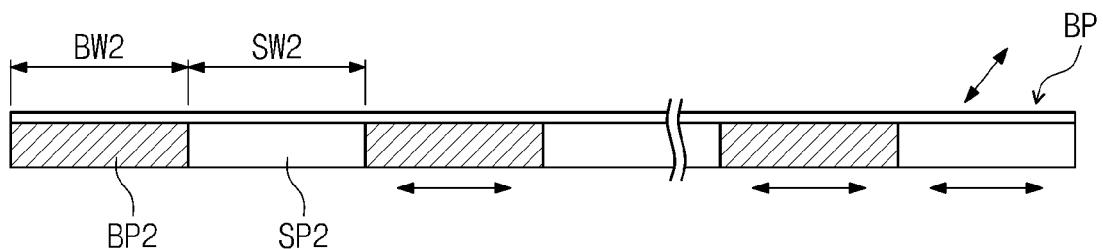
Figure 7D:
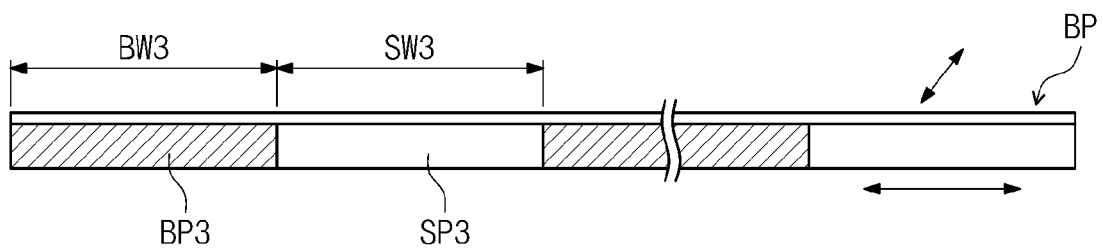

As shown in FIG. 7C and FIG. 7D, the widths BW2 and BW3 of the barrier patterns BP2 and BP3 and the widths SW2 and SW3 of the slit patterns SP2 and SP3 may vary.

FIG. 7C shows the barrier panel BP including the odd-numbered first electrodes 110E1 to 110Em-1 applied with the second voltage and the even-numbered first electrodes 110E2 to 110Em applied with the first voltage. In this case, the second electrodes 120E1 to 120Em are applied with the first voltage.

Thus, the width BW2 of each of the barrier patterns BP2 corresponds to the width W1 of each of the odd-numbered first electrodes 110E1 to 110En-1. The width SW2 of each of the slit patterns SP2 corresponds to the width W2 of each of the even-numbered first electrodes 110E2 to 110En-1.

In FIG. 7D, the voltage applied to the second electrodes 120E1 to 120En is changed in the unit of two second electrodes. In detail, the first and second second-electrodes 120E1 and 120E2 are applied with the second voltage and the third and fourth second-electrodes 120E3 and 120E4 are applied with the first voltage. In this case, the first electrodes 110E1 to 110En are applied with the first voltage.

Accordingly, the width BW3 of each of the barrier patterns BP3 corresponds to a sum of two widths W1 of the two second electrodes. In addition, the width SW3 of each of the slit patterns SP3 corresponds to a sum of two widths W1 of the two first electrodes.

Meanwhile, the widths of the barrier patterns BP1, BP2, and BP3 and the widths of the slit patterns SP1, SP2, and SP3 determine the focal length of the 3D image. Thus, the widths of the barrier patterns BP1, BP2, and BP3 and the widths of the slit patterns SP1, SP2, and SP3 depend on a distance between the barrier panel BP and the user.

In addition, different from the liquid crystal display panel, a display apparatus employing a display panel not including the polarizing plates allows the barrier panel BP to further include additional polarizing member disposed under the first electrodes 110E1 to 110En and the second electrodes 120E1 to 120Em.

Figure 8A:
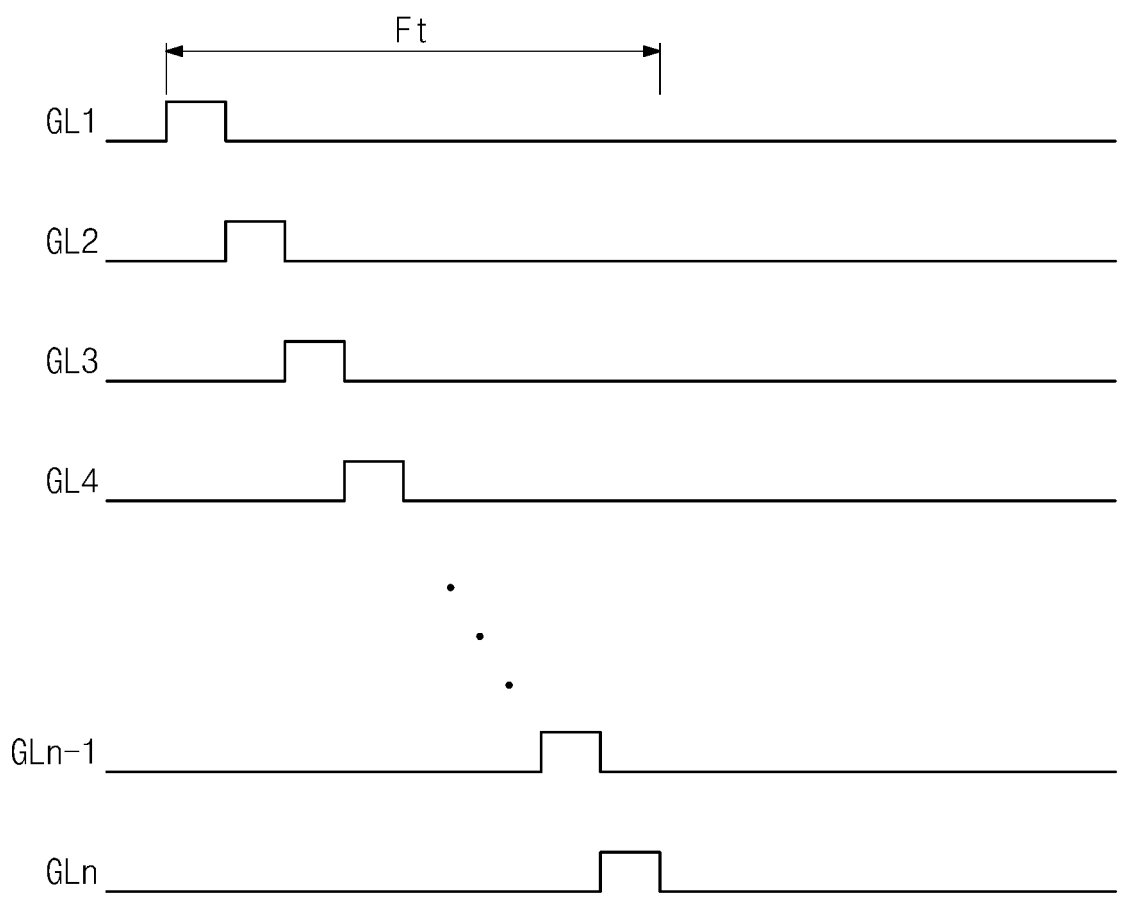
FIG. 8A is a timing diagram that illustrates signals when a display apparatus shown in FIG. 1 displays a two-dimensional image.
Figure 8B:
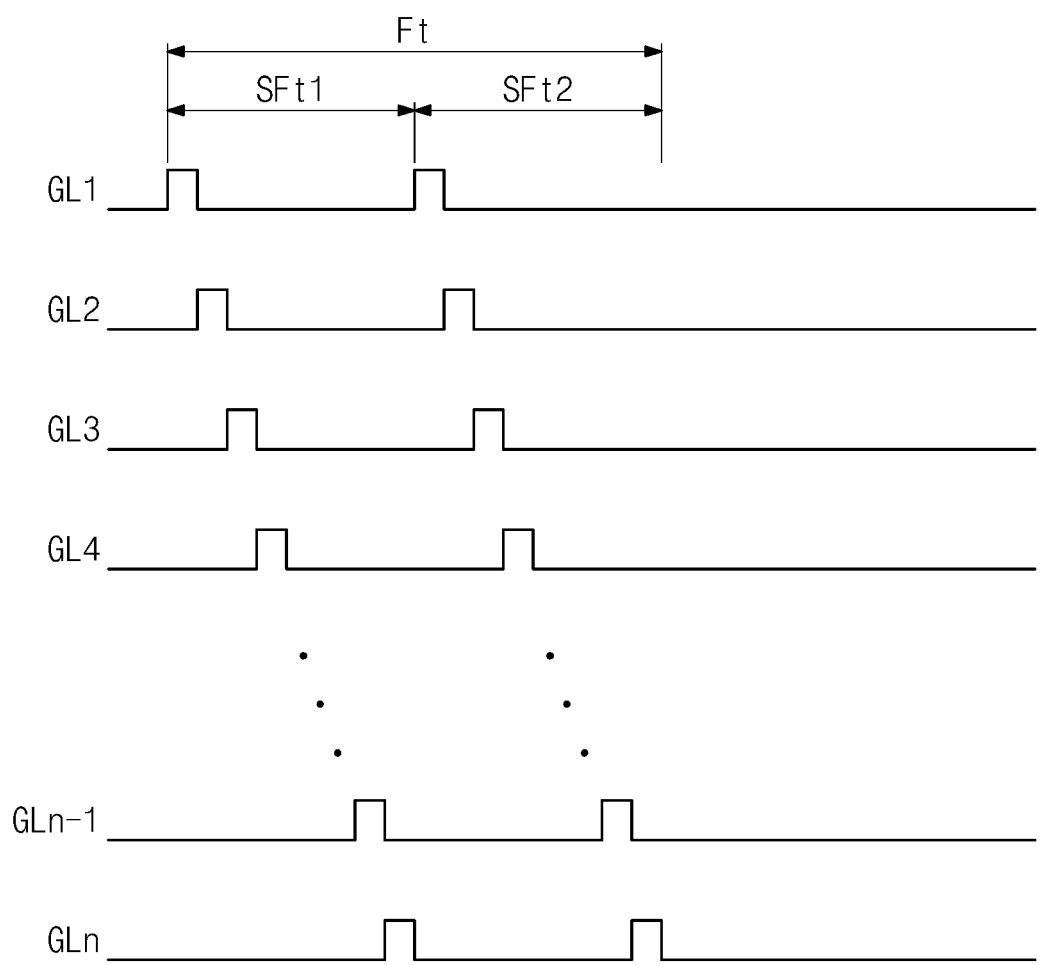
FIG. 8B is a timing diagram that illustrates signals when a display apparatus shown in FIG. 1 displays a three-dimensional image.
Figure 9A:
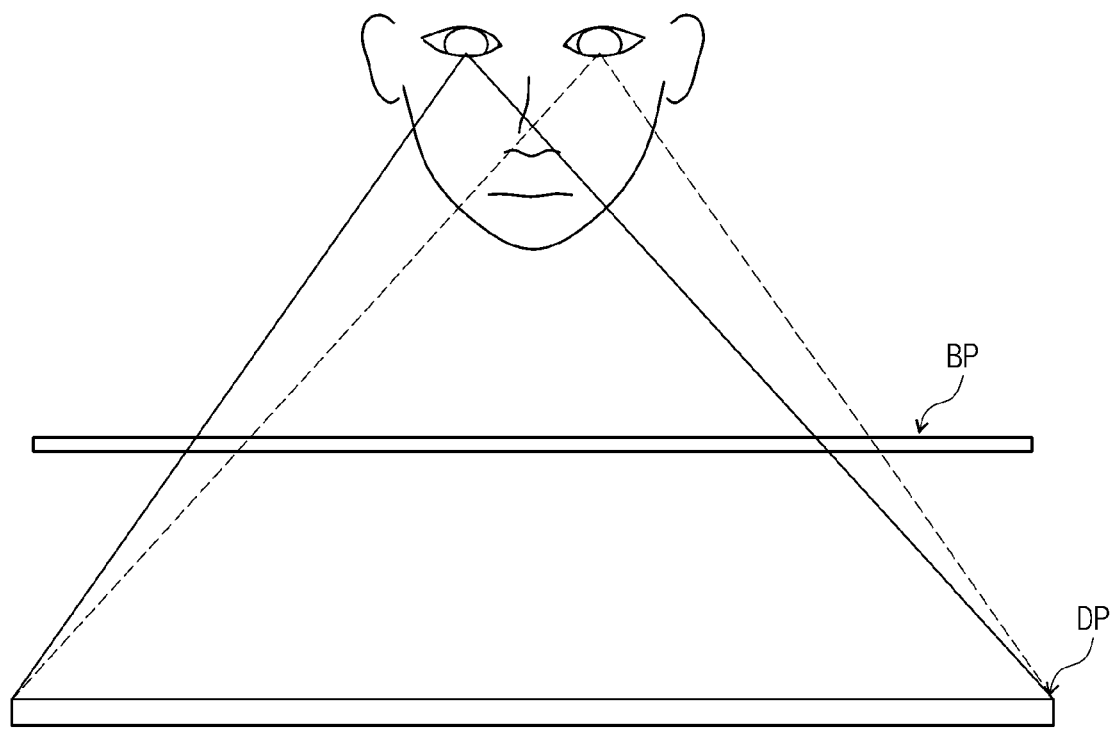
FIG. 9A is a view that illustrates a display apparatus shown in FIG. 1 displaying a two-dimensional image.
Figure 9B:
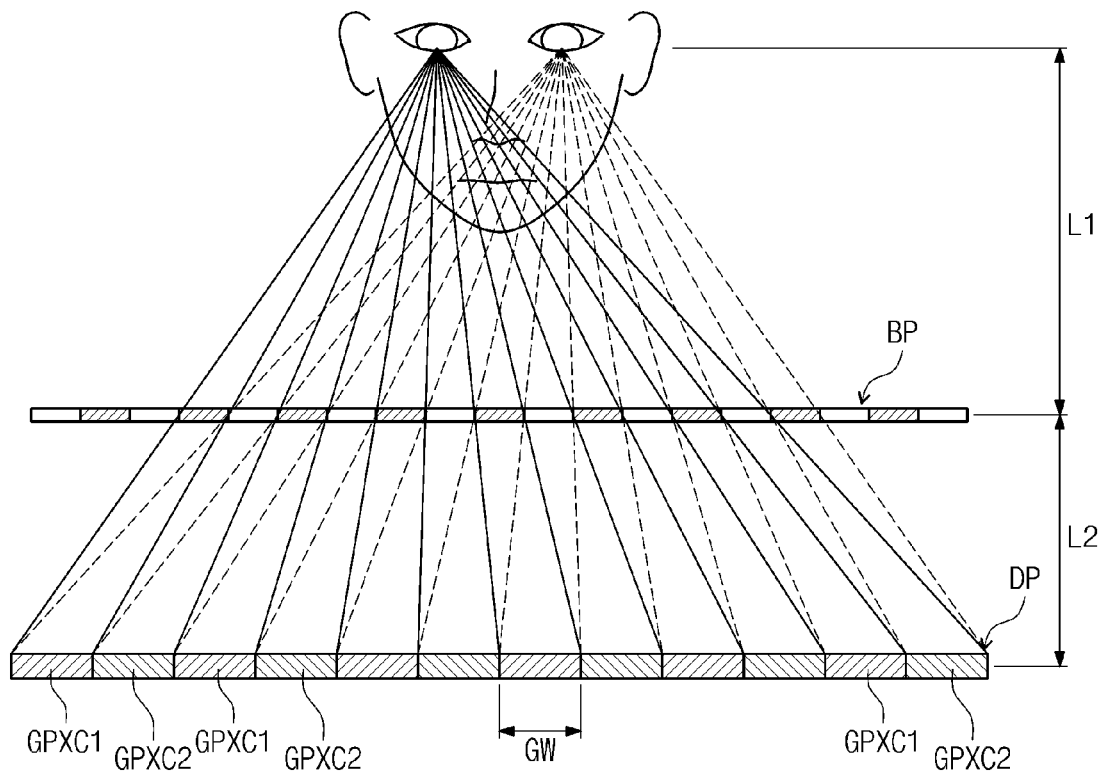
FIG. 9B is a view that illustrates a display apparatus shown in FIG. 1 displaying a three-dimensional image.

FIG. 8A is a timing diagram that illustrates signals when the display apparatus shown in FIG. 1 displays a 2D image and FIG. 8B is a timing diagram that illustrates signals when the display apparatus shown in FIG. 1 displays a 3D image. FIG. 9A is a view that is illustrates the display apparatus shown in FIG. 1 displaying the 2D image and FIG. 9B is a view that illustrates the display apparatus shown in FIG. 1 displaying the 3D image. Hereinafter, an operation of the display apparatus will be described with reference to FIG. 2, FIG. 8A, FIG. 8B, FIG. 9A, and FIG. 9B.

The operation of the display apparatus in the 2D mode will be described with reference to FIG. 2, FIG. 8A, and FIG. 8B. The display apparatus further includes a driving circuit to drive the display panel DP and a barrier panel controller BPC to control the barrier panel BP. The driving circuit includes the timing controller TCP (hereinafter, referred to as controller), a gate driver GCP, and a data driver DCP.

The controller TCP controls the gate driver GCP and the data driver DCP in response to a 2D mode selection control signal provided through a user interface or a 2D identification code extracted from input image signals RGB such that the gate driver GCP and the data driver DCP are driven in the 2D mode.

The controller TCP receives the input image signals RGB and various control signals CS from an external graphic controller (not shown). The controller TCP converts the input image signals RGB into image data R'G'B' appropriate to the operating condition of the display panel in the 2D mode and outputs the image data R'G'B'. The controller TCP receives various control signals CS, such as a vertical synchronization signal, a horizontal synchronization signal, a main clock, a data enable signal, etc., to output first, second, and third control signals CT1, CT2, and CT3.

The first control signal CT1 is used to control the gate driver GCP. The first control signal CT1 includes a vertical start signal indicating a start of the operation of the gate driver GCP, a gate clock signal determining an output timing of the gate voltage, and an output is enable signal determining an ON pulse width of the gate voltage. In addition, the first control signal CT1 may include a 2D synchronization signal.

The second control signal CT2 is used to control the data driver DCP. The second control signal CT2 includes a horizontal start signal indicating a start of the operation of the data driver DCP, an inverting signal inverting a polarity of the data voltage, and an output indicating signal determining an output timing of the data voltage.

The third control signal CT3 is used to synchronize the barrier panel BP with the display panel. To this end, the third control signal CT3 may be a 2D synchronization signal and applied to the barrier panel controller BPC.

As shown in FIG. 2, the gate driver GCP receives the first control signal CT1 and a gate driving voltage $V_{SS}$. The gate driver GCP outputs the gate voltage in response to the first control signal CT1 as shown in FIG. 8. The gate voltage is sequentially applied to the gate lines GL1 to GLn during one frame period Ft.

The data driver DCP receives the image data R'G'B' from the controller TCP as shown in FIG. 2. In addition, the data driver DCP receives a gamma reference voltage GVDD to convert the image data R'G'B' into data voltages.

The barrier panel controller BPC receives the third control signal CT3 and a barrier panel driving voltage $V_{BP}$ as shown in FIG. 2. The barrier panel controller BPC applies the first voltage Voff to the barrier panel BP in response to the third control signal CT3. The first voltage Voff may be the ground voltage.

The first electrodes 110E1 to 110En and the second electrodes 120E1 to 120Em, which are included in the barrier panel BP, receive the first voltage Voff. Accordingly, the arrangement of the liquid crystal molecules of the liquid crystal layer 130 is not changed since the first electrodes 110E1 to 110En and the second electrodes 120E1 to 120Em are applied with the same voltage. That is, the barrier patterns (refer to FIG. 7A) are not formed. The barrier panel BP operated in the normally white mode transmits the 2D image generated by the display panel DP without any changes.

As a result, the display panel DP displays one 2D image during one frame period as shown in FIG. 9A. The 2D image is provided to the left and right eyes of the user.

Meanwhile, since the barrier panel BP includes the first electrodes 110E1 to 110En having the first width W1 and the second electrodes 120E1 to 120Em having the second width W2 different from the first width W1, a moiré phenomenon of the 2D image transmitting through the barrier panel BP may be reduced. That is, since the barrier panel BP includes two kinds of electrodes having different widths from each other, repeated periods of the two kinds of electrodes are longer than those of a conventional barrier panel. Therefore, the moiré phenomenon may be reduced.

Hereafter, the operation of the display apparatus in the 3D mode will be described with reference to FIG. 2, FIG. 8B, and FIG. 9B.

The controller TCP controls the gate driver GCP and the data driver DCP in response to a 3D mode selection control signal provided through the user interface or a 3D identification code extracted from the input image signals RGB such that the gate driver GCP and the data driver DCP are driven in the 3D mode.

The controller TCP receives a selection signal FSS to determine the focal length of the 3D image. The selection signal FSS indicates information of distance between the barrier panel BP and the user. Accordingly, when the focal length is changed, a level of the selection signal FSS is changed. The level of the selection signal FSS is decided by an input from the user is or by a value calculated by a focal length measuring unit (not shown) such as a camera. The controller TCP applies the selection signal FSS to the data driver DCP and the barrier panel controller BPC.

The controller TCP converts the input image signals RGB into a left-eye image data and a right-eye image data in the 3D mode. The left-eye image data is divided into a first left-eye image data RGB-L1 and a second left-eye image data RGB-L2, and the right-eye image data is divided into a first right-eye image data RGB-R1 and a second right-eye image data RGB-R2.

The first left-eye image data RGB-L1 may be the image data applied to the first pixel column groups GPXC1 (refer to FIG. 4) and the second left-eye image data RGB-L2 may be the image data applied to the second pixel column groups GPXC2 (refer to FIG. 4). In addition, the first right-eye image data RGB-R1 may be the image data applied to the second pixel column groups GPXC2 and the second right-eye image data RGB-R2 may be the image data applied to the first pixel column groups GPXC1.

The controller TCP applies the first left-eye image data RGB-L1, the second left-eye image data RGB-L2, the first right-eye image data RGB-R1, and the second right-eye image data RGB-R2 to the data driver DCP. In addition, the controller TCP applies the second control signal CT2 including the 3D synchronization signal to the data driver DCP.

In addition, the controller TCP applies the first control signal CT1 including the 3D synchronization signal to the gate driver GCP and applies the third control signal CT3 including the 3D synchronization signal to the barrier panel controller BPC.

As shown in FIG. 8B, the gate driver GCP outputs the gate voltage in response to the first control signal CT1. The gate driver GCP sequentially outputs the gate voltage to the is gate lines GL1 to GLn during a first sub-frame period SFt1 and sequentially outputs the gate voltage to the gate lines GL1 to GLn during a second sub-frame period SFt2. The length of the sum of the first sub-frame period SFt1 and the second sub-frame period SFt2 is the same as that of the frame period Ft. Accordingly, the display apparatus operates at a frequency in the 3D mode, which is higher than a frequency in the 2D mode. For instance, the display apparatus operates at a frequency of about 60 Hz in the 2D mode and operates at a frequency of about 120 Hz in the 3D mode. In addition, the pulse width of the gate voltage in the 3D mode may be smaller than the pulse width of the gate voltage in the 2D mode.

The data driver DCP receives the first left-eye image data RGB-L1, the second left-eye image data RGB-L2, the first right-eye image data RGB-R1, and the second right-eye image data RGB-R2 to the data driver DCP as shown in FIG. 2.

The data driver DCP receives the gamma reference voltage GVDD during the first sub-frame period SFt1, converts the first left-eye image data RGB-L1 and the first right-eye image data RGB-R1 into the data voltages, and outputs the data voltages to the first pixel column groups GPXC1 and the second pixel column groups GPXC2.

In addition, the data driver DCP receives the gamma reference voltage GVDD during the second sub-frame period SFt2, converts the second right-eye image data RGB-R2 and the second left-eye image data RGB-L2 into the data voltages, and outputs the data voltages to the first pixel column groups GPXC1 and the second pixel column groups GPXC2.

Thus, the first pixel column groups GPXC1 and the second pixel column groups GPXC2 respectively display the first left-eye image and the first right-eye image during one frame period Ft and then display the second right-eye image and the second left-eye image, respectively. As a result, the display apparatus may provide the 3D image with high display quality.

Meanwhile, the relation between the focal length L1, the width GW of the first pixel column groups and the second pixel column groups, the width BW1 of the barrier pattern BP1, and the width SW1 of the slit pattern SP1 satisfies the following equation.

$$L1 = \frac{L2 \times (BW1 + SW1)}{2GW - (BW1 + SW1)} \quad \text{Equation}$$

As shown in FIG. 9B, L2 denotes the distance between the display panel DP and the barrier panel BP. L2 may be a fixed value.

As represented by the equation, when the width of each of the first pixel column groups GPXC1 is equal to the width of each of the second pixel column groups GPXC2, the sum of the width of one pixel column of the first pixel column groups GPXC1 and the width of one pixel column of the second pixel column groups GPXC2 is substantially greater than the sum of the width BW1 of the barrier pattern BP1 and the width SW1 of the slit pattern SP1.

As described with reference to FIG. 4, each of the first pixel column groups GPXC1 and each of the second pixel column groups GPXC2 includes at least two pixel columns of the pixel columns PXC1 to PXCn. Thus, the width of each of the first pixel column groups GPXC1 and the width of each of the second pixel column groups GPXC2 may vary.

The data driver DCP applied with the selection signal FSS defines a portion of the pixel columns PXC1 to PXCn to be the first pixel column groups GPXC1 and a remaining portion of the pixel columns PXC1 to PXCn to be the second pixel column groups GPXC2 based on the level of the selection signal FSS. Accordingly, the first pixel column groups GPXC1 and the second pixel column groups GPXC2 have the width appropriate to the focal length L1.

The barrier panel controller BPC receives the third control signal CT3, the selection signal FSS, and the barrier panel driving voltage $V_{BP}$ as shown in FIG. 2.

The focal length L1 and the distance L2 between the display panel DP and the barrier panel BP are determined according to the above-mentioned equation. The barrier panel controller BPC may generate barrier data based on the level of the selection signal FSS. The barrier data is used to determine the width BW1 of the barrier pattern BP1 and the width SW1 of the slit pattern SP1.

The barrier panel controller BPC converts the barrier panel driving voltage $V_{BP}$ into the first voltage Voff and the second voltage Von different from the first voltage Von and applies the first and second voltages Voff and Von to the barrier panel BP. The first voltage Voff and the second voltage Von are generated based on the barrier data and the 3D synchronization signal. The first voltage Voff may be the ground voltage.

The barrier panel controller BPC applies the first voltage Voff to the portion of the first electrodes 110E1 to 110En and applies the second voltage Von to the remaining portion of the first electrodes 110E1 to 110En. In this case, the second electrodes 120E1 to 120Em receive the first voltage Voff. The slit patterns (refer to FIG. 7A, FIG. 7B, FIG. 7C, and FIG. 7D) are formed in the areas corresponding to the first electrodes applied with the first voltage Voff, and the barrier patterns (refer to FIG. 7A, FIG. 7B, FIG. 7C, and FIG. 7D) are formed in the areas corresponding to the first electrodes applied with the second voltage Von.

The barrier panel controller BPC applies the first voltage Voff to the portion of the second electrodes 120E1 to 120Em and applies the second voltage Von to the remaining portion of the second electrodes 120E1 to 120Em. In this case, the first electrodes 110E1 to 110En receive the first voltage Voff.

Figure 10A:
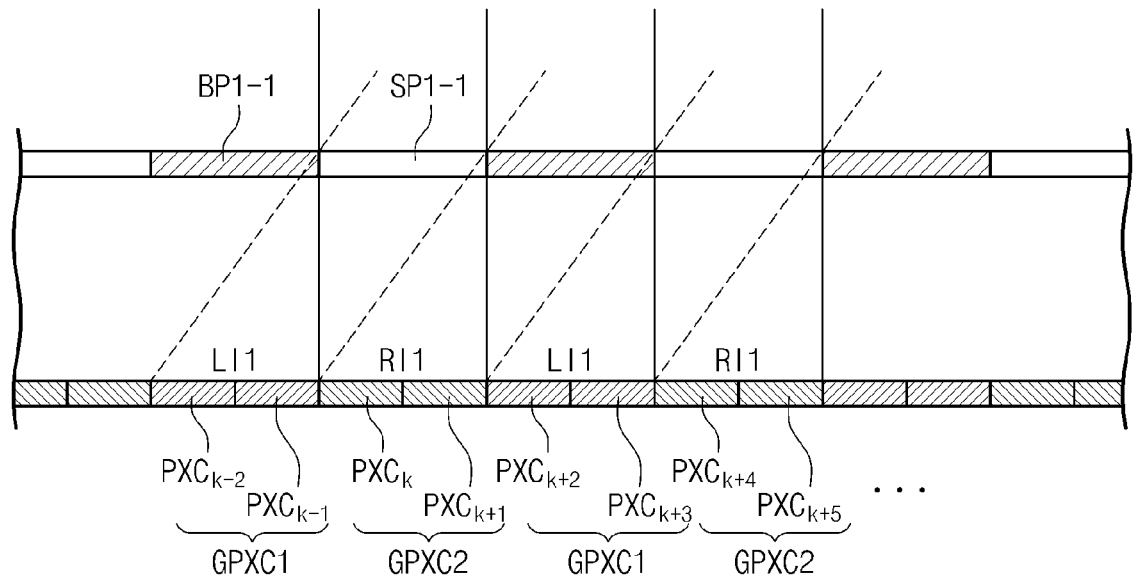
FIG. 10A and FIG. 10B are views that illustrate a display apparatus displaying a three-dimensional image with a first focal length.
Figure 10B:
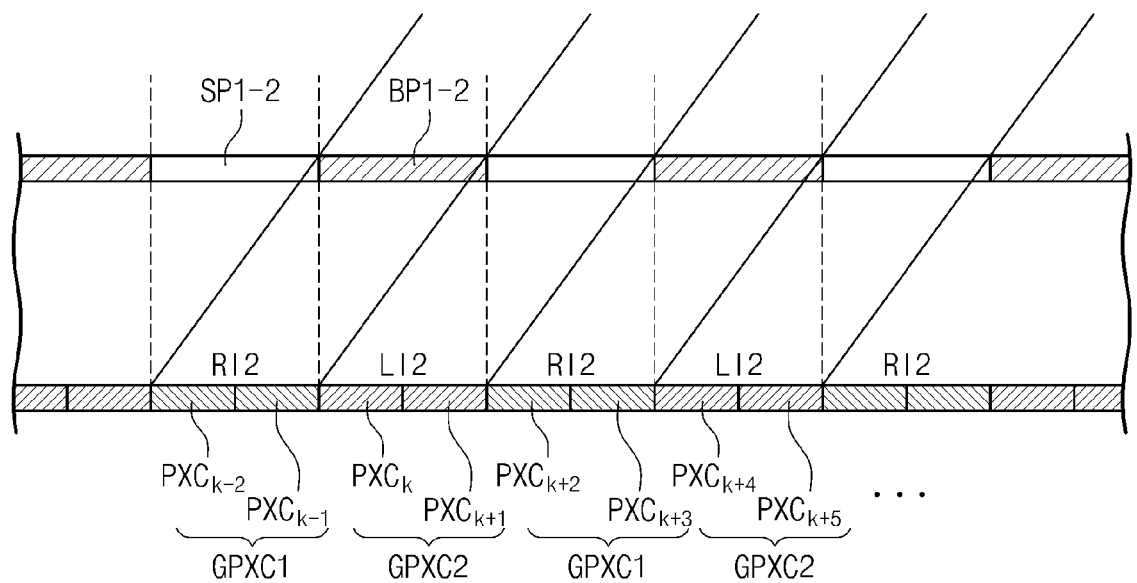

FIG. 10A and FIG. 10B are views that illustrate a display apparatus displaying a three-dimensional image with a first focal length. In the display apparatus shown in FIG. 10A and FIG. 10B, each of the first pixel column groups GPXC1 and each of the second pixel column groups GPXC2 include two pixel columns of the pixel columns PXC1 to PXCn according to the equation. In FIG. 10A and FIG. 10B, pixel columns PXCk-2 to PXCk+5 have been shown among the pixel columns PXC1 to PXCn.

Referring to FIG. 10A, when the first pixel column groups GPXC1 display the first left-eye image LI1 and the second pixel column groups GPXC2 display the first right-eye image RI1 during the first sub-frame period SFt1 (refer to FIG. 8B), the barrier panel BP forms a plurality of first barrier patterns BP1-1 spaced apart from each other. A plurality of first slit patterns SP1-1 is disposed between the first barrier patterns BP1-1. As described with reference to FIG. 7B, the first slit patterns SP1-1 respectively disposed between the first barrier patterns BP1-1 are formed by applying the second voltage Von to the odd-numbered second electrodes 120E1 to 120Em-1, applying the first voltage Voff to the even-numbered second electrodes 120E2 to 120Em, and applying the first voltage Voff to the first electrodes 110E1 to 110En.

Referring to FIG. 10B, when the first pixel column groups GPXC1 display the second right-eye image RI2 and the second pixel column groups GPXC2 display the second left-eye image LI2 during the second sub-frame period SFt2 (refer to FIG. 8B), the barrier panel BP forms a plurality of second barrier patterns BP1-2 spaced apart from each other. A plurality of second slit patterns SP1-2 is disposed between the second barrier patterns BP1-2. The second barrier patterns BP1-2 and the second slit patterns SP1-2 are different from the first barrier patterns BP1-1 and the first slit patterns SP1-1.

As described with reference to FIG. 7B, the second slit patterns SP1-2 respectively disposed between the second barrier patterns BP1-2 are formed by applying the second voltage Von to the even-numbered second electrodes 120E2 to 120Em, applying the first voltage Voff to the odd-numbered second electrodes 120E1 to 120Em-1, and applying the first voltage Voff to the first electrodes 110E1 to 110En.

The left eye of the user perceives the first left-eye image LI1 through the first slit patterns SP1-1 during the first sub-frame period SFt1 and the right eye of the user perceives the first right-eye image RI1 through the first slit patterns SP1-1 during the first sub-frame period SFt1. In addition, the left and right eyes of the user respectively perceive the second left-eye image LI2 and the second right-eye image RI2 through the second slit patterns SP1-2 during the second sub-frame period SFt2.

Figure 11A:
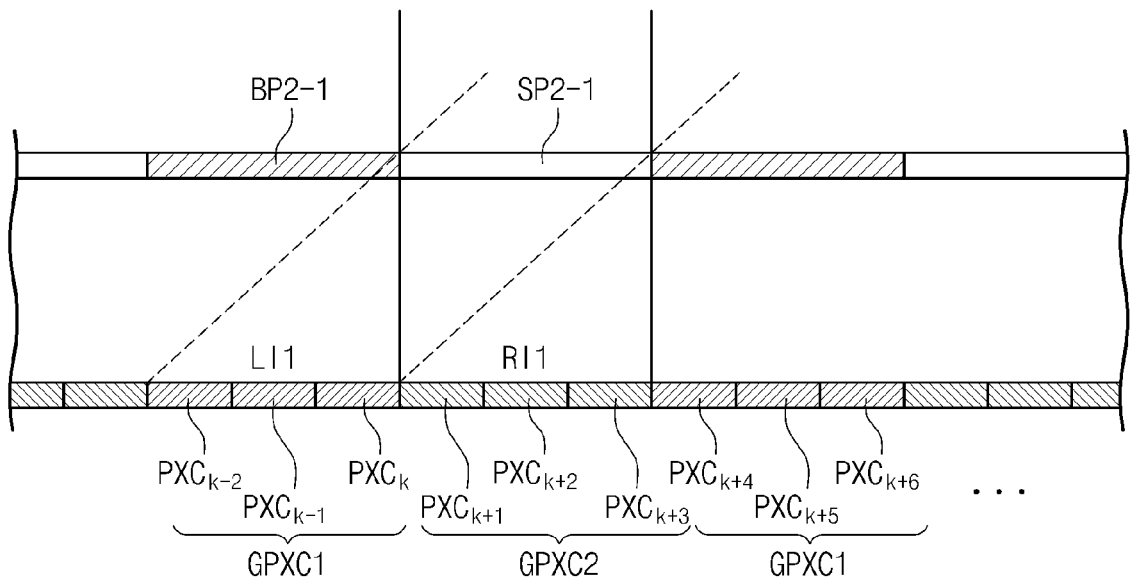
FIG. 11A and FIG. 11B are views that illustrate a display apparatus displaying a three-dimensional image with a second focal length.
Figure 11B:
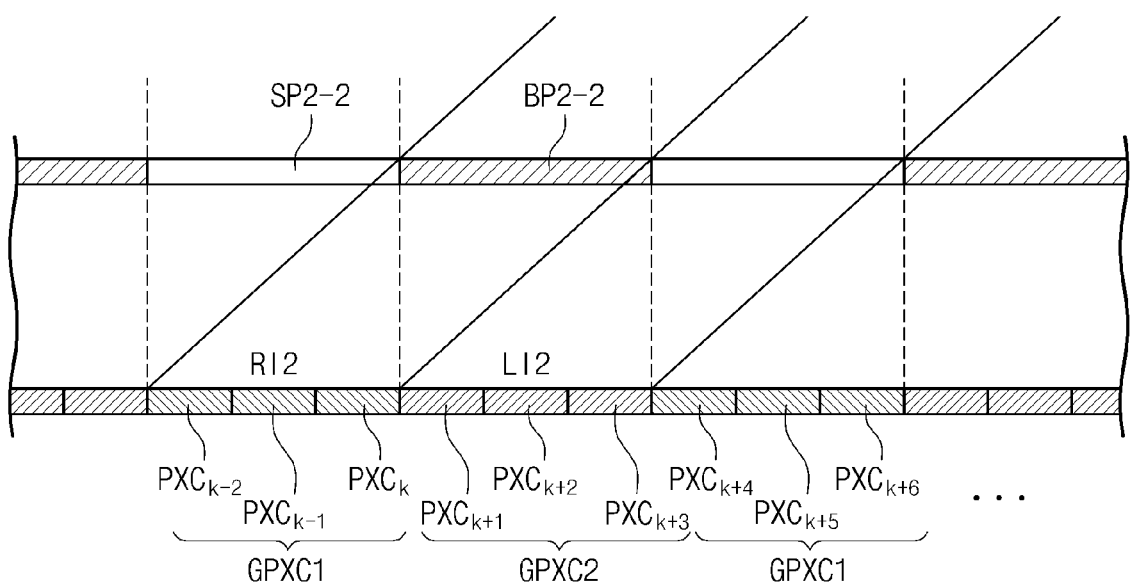

FIG. 11A and FIG. 11B are views that illustrate a display apparatus displaying a three-dimensional image with a second focal length. The second focal length is shorter than the first focal length. As the focal length becomes short, the number of the pixel columns included in the first pixel column groups GPXC1 and the second pixel column groups GPXC2 increases.

In the display apparatus shown in FIG. 11A and FIG. 11B, each of the first pixel column groups GPXC1 and each of the second pixel column groups GPXC2 include three pixel columns of the pixel columns PXC1 to PXCn according to the equation.

In the present exemplary embodiment, the widths of the first and second barrier patterns BP2-1 and BP2-2 and the first and second slit patterns SP2-1 and SP2-2 are longer than those of the first and second barrier patterns BP1-1 and BP1-2 and the first and second slit patterns SP1-1 and SP1-2 shown in FIG. 10A and FIG. 10B.

As described with reference to FIG. 7C, the first barrier patterns BP2-1 and the is first slit patterns SP2-1 are formed by applying the second voltage Von to the odd-numbered first electrodes 110E1 to 110En-1, applying the first voltage Voff to the even-numbered first electrodes 110E2 to 110En, and applying the first voltage Voff to the second electrodes 120E1 to 120Em.

In addition, the second barrier patterns BP2-2 and the second slit patterns SP2-2 are formed by applying the second voltage Von to the even-numbered first electrodes 110E2 to 110En, applying the first voltage Voff to the odd-numbered first electrodes 110E1 to 110En-1, and applying the first voltage Voff to the second electrodes 120E1 to 120Em.

Figure 12A:
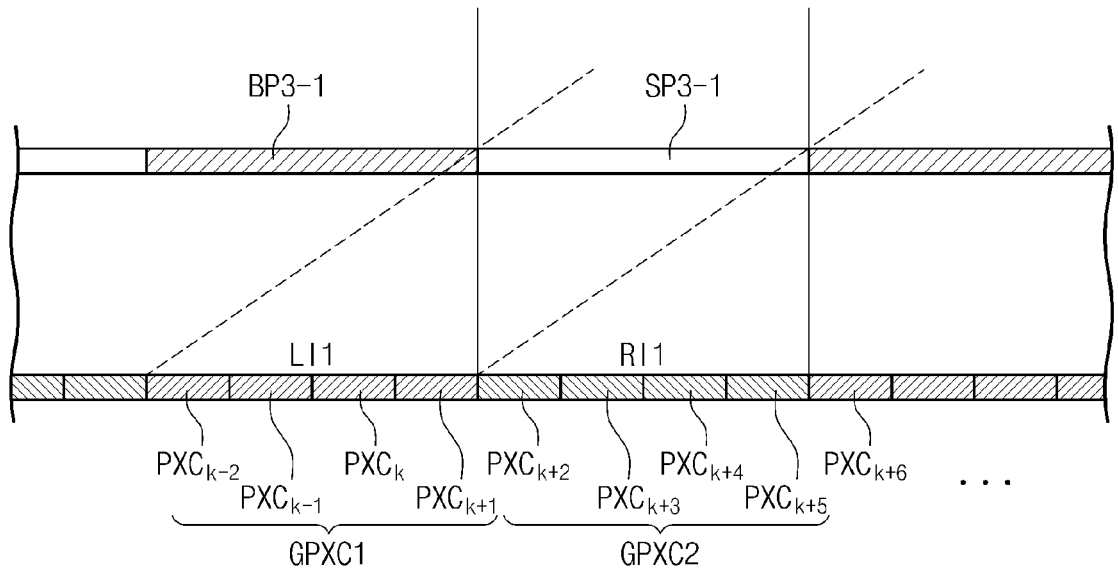
FIG. 12A and FIG. 12B are views that illustrate a display apparatus displaying a three-dimensional image with a third focal length.
Figure 12B:
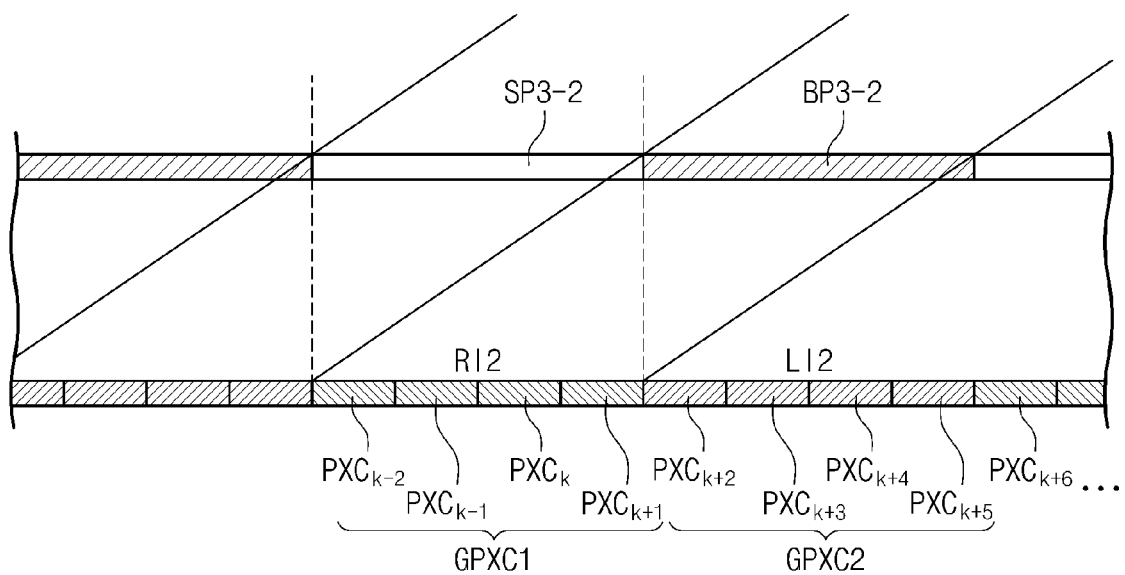

FIG. 12A and FIG. 12B are views that illustrate a display apparatus displaying a three-dimensional image with a third focal length. In the display apparatus shown in FIG. 12A and FIG. 12B, each of the first pixel column groups GPXC1 and each of the second pixel column groups GPXC2 include four pixel columns of the pixel columns PXC1 to PXCn according to the equation.

The first and second barrier patterns BP3-1 and BP3-2 and the first and second slit patterns SP3-1 and SP3-2, which are shown in FIG. 12A and FIG. 12B, may be formed in the above manner described with reference to FIG. 7D, FIG. 10A, FIG. 10B, FIG. 11A, and FIG. 11B.

When using the manner described with reference to FIG. 10A, FIG. 10B, FIG. 11A FIG. 11B, FIG. 12A, and FIG. 12B, the first and second barrier patterns and the first and second slit patterns may be formed to have various widths. Thus, the display apparatus may provide the 3D image having plural focal lengths to the user.

Although the exemplary embodiments of the present invention have been described, it is understood that the present invention should not be limited to these exemplary is embodiments but various changes and modifications can be made by one ordinary skilled in the art within the spirit and scope of the present invention as hereinafter claimed.

What is claimed is:

1. A display apparatus, comprising:
a display panel comprising a plurality of pixel columns, the plurality of pixel columns to be divided into first pixel column groups and second pixel column groups based on a selection signal, the first pixel column groups to display a first left-eye image before displaying a second right-eye image and the second pixel column groups to display a first right-eye image before displaying a second left-eye image;
a barrier panel to form a plurality of first barrier patterns spaced apart from each other when the first pixel column groups display the first left-eye image and the second pixel column groups display the first right-eye image and to form a plurality of second barrier patterns spaced apart from each other and different from the first barrier patterns when the first pixel column groups display the second right-eye image and the second pixel column groups display the second left-eye image, the selection signal being indicative of a distance between the barrier panel and a user; and
a barrier panel controller to control at least one of a first interval between the first barrier patterns and a second interval between the second barrier patterns based on the selection signal,
wherein the barrier panel comprises:
a plurality of first electrodes having a first pattern extending in a direction in which the pixel columns extend, wherein each of the plurality of first electrodes has a first width;
a plurality of second electrodes having a second pattern extending in the direction in which the first electrodes extend, and facing the first electrodes, wherein each of the plurality of second electrodes has a second width different from the first width;
a liquid crystal layer disposed between the first electrodes and the second electrodes; and
a polarizer disposed on the first electrodes and the second electrodes,
wherein each of the plurality of first electrodes overlaps at least one of the plurality of second electrodes, and
wherein the first electrodes, the second electrodes, the liquid crystal layer, and the polarizer are configured to form the first barrier patterns and the second barrier patterns.

2. The display apparatus of claim 1, wherein the barrier panel controller is configured to apply a first voltage and a second voltage to a portion of the first electrodes and a remaining portion of the first electrodes, respectively, based on the selection signal, or apply the first voltage and the second voltage to a portion of the second electrodes and a remaining portion of the second electrodes, respectively, based on the selection signal.

3. The display apparatus of claim 2, wherein the first voltage is a ground voltage.

4. The display apparatus of claim 3, wherein the second electrodes are configured to receive the first voltage when the first voltage is applied to the portion of the first electrodes and the second voltage is applied to the remaining portion of the first electrodes.

5. The display apparatus of claim 3, wherein the first electrodes are configured to receive the first voltage when the first voltage is applied to the portion of the second electrodes and the second voltage is applied to the remaining portion of the second electrodes.

6. The display apparatus of claim 1, wherein the first width is smaller than the second width.

7. The display apparatus of claim 6, wherein the first width is equal to a sum of widths of two pixel columns adjacent to each other among the pixel columns.

8. The display apparatus of claim 6, wherein the second width is equal to a sum of width of three pixel columns adjacent to each other among the pixel columns.

9. The display apparatus of claim 1, wherein the first pixel column groups are alternately arranged with the second pixel column groups.

10. The display apparatus of claim 9, wherein each of the first pixel column groups comprises at least two pixel columns adjacent to each other among the pixel columns and each of the second pixel column groups comprises at least two pixel columns adjacent to each other and different from the two pixel columns of the first pixel column groups among the pixel columns.

11. The display apparatus of claim 10, wherein the width of each of the first pixel column groups corresponds to a width of each of the first barrier patterns and a width of each of the second barrier patterns, and the width of each of the second pixel column groups corresponds to the width of each of the first barrier patterns and the width of each of the second barrier patterns.

12. The display apparatus of claim 1, wherein each of the pixel columns comprises a plurality of pixels, each pixel comprising a liquid crystal capacitor and a thin film transistor configured to apply a voltage to the liquid crystal capacitor.

13. The display apparatus of claim 12, wherein the liquid crystal capacitor comprises a first electrode, a second electrode facing the first electrode, and a liquid crystal layer disposed between the first electrode and the second electrode, and the display panel comprises a first substrate comprising the thin film transistor and the first electrode of the liquid crystal capacitor and a second substrate comprising the second electrode of the liquid crystal capacitor.

14. The display apparatus of claim 1, wherein three successive pixel columns comprise color filters having different colors from each other.

15. A display apparatus comprising:
a display panel comprising a plurality of pixel columns, the plurality of pixel columns to be divided into first pixel column groups and second pixel column groups based on a distance signal indicative of a distance between the display panel and a user, the first pixel column groups to display a first left-eye image and the second pixel column groups to display a first right-eye image during a first time period, and the first pixel column groups to display a second right-eye image and the second pixel column groups to display a second left-eye image during a second time period;
a barrier panel to form a plurality of first barrier patterns spaced apart from each other and a plurality of first slit patterns respectively disposed between the first barrier patterns during the first time period to allow the first left-eye image to be directed to a left eye of the user and the first right-eye image to be directed to a right eye of the user through the plurality of first slit patterns, and to form a plurality of second barrier patterns spaced apart from each other and a plurality of second list patterns respectively disposed between the second barrier patterns during the second time period to allow the second left-eye image to be directed to the left eye of the user and the second right-eye image to be directed to the right eye of the user through the plurality of second slit patterns; and
a barrier panel controller to control at least one of a width of each of the first barrier patterns and a width of each of the second barrier patterns based on the distance signal,
wherein the barrier panel comprises:
a plurality of first electrodes having a first pattern extending in a direction in which the pixel columns extend, wherein each of the plurality of first electrodes has a first width;
a plurality of second electrodes having a second pattern extending in the direction in which the first electrodes extend, and facing the first electrodes, wherein each of the plurality of second electrodes has a second width different from the first width;
a liquid crystal layer disposed between the first electrodes and the second electrodes; and
a polarizer disposed on the first electrodes and the second electrodes,
wherein each of the plurality of first electrodes overlaps at least one of the plurality of second electrodes, and
wherein the first electrodes, the second electrodes, the liquid crystal layer, and the polarizer are configured to form the first barrier patterns, the second barrier patterns, the first slit patterns, and the second slit patterns.

16. The display apparatus of claim 15, wherein the barrier panel is configured to form a plurality of second barrier patterns different from the first barrier patterns and a plurality of second slit patterns different from the second barrier patterns when the display panel displays the second right-eye image and the second left-eye image.

17. A method of displaying a three dimensional image using a display panel and a barrier panel, the method comprising:
displaying, on the display panel, a first left-eye image using a first pixel column group and a first right-eye image using a second pixel column group different from the first pixel column group;
forming, using the barrier panel, first barrier patterns and first slit patterns, the first left-eye image and the first right-eye image being visible through the first slit patterns; and
determining a distance between the barrier panel and a viewer,
wherein a width of the first slit patterns and a number of pixel columns included in at least one of the first pixel column group and the second pixel column group is determined according to the distance, and
wherein the barrier panel comprises:
a plurality of first electrodes having a first pattern extending in a direction in which the pixel columns extend, wherein each of the plurality of first electrodes has a first width;
a plurality of second electrodes having a second pattern extending in the direction in which the first electrodes extend, and facing the first electrodes, wherein each of the plurality of second electrodes has a second width different from the first width;
a liquid crystal layer disposed between the first electrodes and the second electrodes,
wherein each of the plurality of first electrodes overlaps at least one of the plurality of second electrodes.

* * * * *